Nov. 18, 1969
H. K. ORTHMAN
3,478,502
WINDROW TURNING DEVICE
Filed Nov. 4, 1965
2 Sheets-Sheet 2
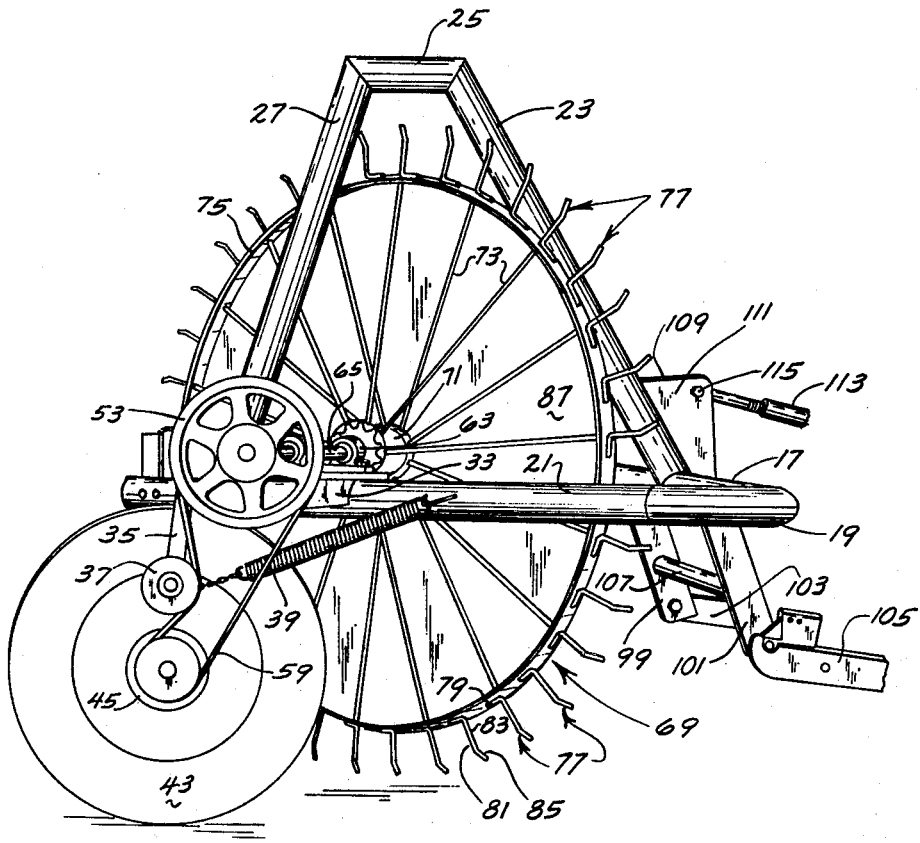
Fig. 4
Fig. 5
INVENTOR
HENRY K. ORTHMAN
BY
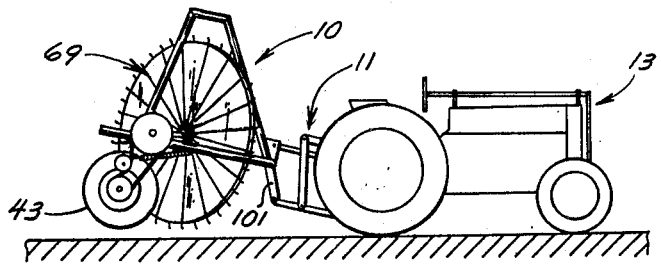
ATTORNEYS

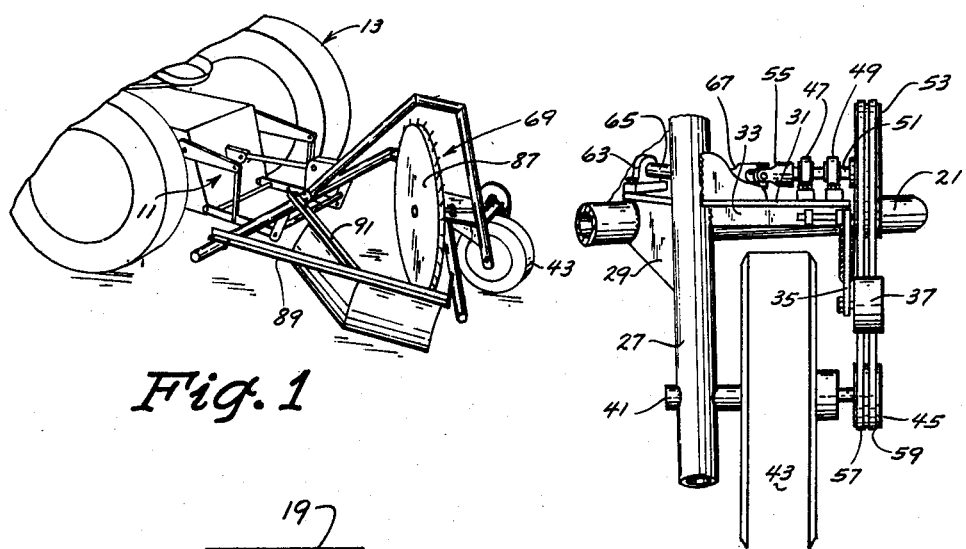
Fig. 1
Fig. 3
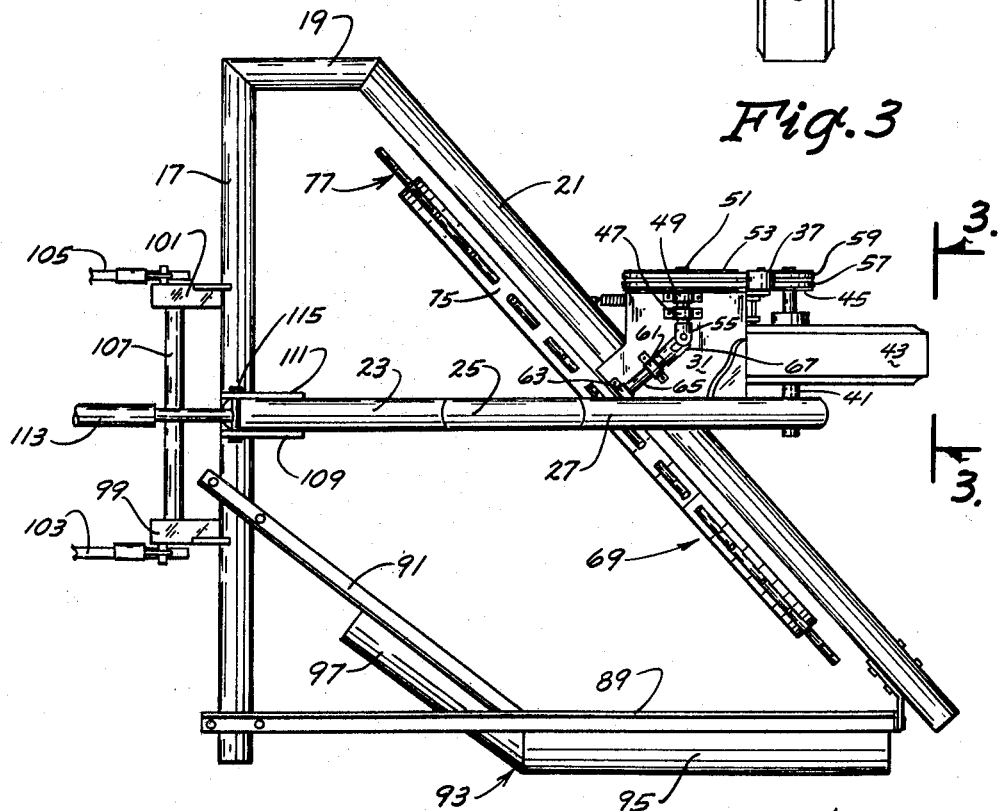
Fig. 2
INVENTOR
HENRY K. ORTHMAN
BY
ATTORNEYS

United States Patent Office 3,478,502
Patented Nov. 18, 1969

3,478,502
WINDROW TURNING DEVICE
Henry K. Orthman, Rte. 2, Lexington, Nebr. 68850
Filed Nov. 4, 1965, Ser. No. 506,387
Int. Cl. A01d 79/02
U.S. Cl. 56—366    5 Claims

ABSTRACT OF THE DISCLOSURE

A window turning device including a single windrow turning wheel rotatably mounted on a frame means. The frame means is secured to a tractor multiple point hitch and has a ground engaging drive wheel operatively mounted thereon. A drive means connects the drive wheel with the turning wheel so that rotation of the drive wheel will cause rotation of the turning wheel.

---

Hay and grain crops are often cut and gathered into windrows where the material lies until it is ready to be baled or harvested respectively. It is sometimes necessary to turn the windrow over to aid in the drying of the hay or to prevent the crop in the windrow from sprouting. Conventional side delivery rakes are sometimes used to turn the windrow but are unsatisfactory for several reasons. The conventional side delivery rakes "shell" the crops in the windrows during the turning operation. The conventional side delivery rakes frequently turn the windrow a complete 360 degree revolution or turn which causes the original bottom of the windrow to again be positioned at the bottom of the windrow rather than causing the windrow to be turned 180 degrees so that the original bottom of the windrow is moved to the top of the windrow and the original top of the windrow is moved to the bottom of the windrow.

Additionally, the side delivery rakes are not efficiently powered, are not easily maneuvered, and must be pulled slowly through the field.

Therefore, it is a principal object of this invention to provide a windrow turning device which efficiently turns a windrow.

A further object of this invention is to provide a windrow turning device which efficiently turns a windrow 180 degrees.

A further object of this invention is to provide a windrow turning device which is easily maneuvered.

A further object of this invention is to provide a windrow turning device which is mounted on a tractor by means of a three point hitch to enable the windrow turning device to be selectively raised from the ground.

A further object of this invention is to provide a windrow turning device which is powered by a ground engaging wheel on the device.

A further object of this invention is to provide a windrow turning device which has a frame means which is extremely strong.

A further object of this invention is to provide a windrow turning device utilizing a single raking wheel.

A further object of this invention is to provide a windrow turning device which may be pulled through the field at a high rate of speed.

A further object of this invention is to provide a windrow turning device which does not shell the grain in the windrow.

A still further object of this invention is to provide a windrow turning device which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a partial perspective view of the windrow turning device mounted on a tractor;

FIG. 2 is a top view of the device;

FIG. 3 is a rear view of the device as seen on line 3—3 of FIG. 2 at an enlarged scale;

FIG. 4 is a side view of the device; and

FIG. 5 is a side view of the device mounted on a tractor illustrating the device being raised from the ground by the three point hitch of the tractor.

The numerical 10 generally designates the windrow turning device of this invention which is adapted to be operatively secured to a three point hydraulic hitch means 11 mounted on tractor 13.

The frame means includes a horizontal, transversely extending frame member 17; a frame member 19 secured to one end of frame member 17 by welding or the like and extending horizontally rearwardly therefrom; a frame member 21 secured to the rearward end of frame member 19 by welding or the like and extending horizontally, diagonally rearwardly therefrom. Frame means 15 also includes a frame member 23 secured to frame member 17 intermediate the length thereof by welding or the like which extends upwardly and rearwardly therefrom (FIG. 4) and terminates in a frame member 25 extending rearwardly therefrom. Extending downwardly and rearwardly from frame member 25 is a frame member 27, the lower end of which terminates at a point below and rearwardly of frame member 21 (FIG. 3).

A plate 29 extends between frame member 21 and frame 27 (FIG. 3) and is secured thereto by welding. As best seen in FIG. 3, a horizontal plate 31 is welded to frame member 21 and frame member 27 and extends laterally therefrom. A supporting bar 33 is welded to the underside of plate 31, to frame member 27 and to frame member 21 and has a belt tightener arm 35 pivotally secured at one of its ends thereto. A roller element 37 is rotatably mounted on the lower end of arm 35 (FIG. 4). A spring means 39 is operatively secured to and extends between arm 35 and frame member 21.

Secured to frame member 27 by welding or the like adjacent the lower end thereof is an axle 41 which extends therethrough (FIG. 3). A wheel 43 is rotatably mounted on axle 41 and has a double pulley means 45 secured thereto which is rotated upon rotation of wheel 43. As best seen in FIGS. 2 and 3, a pair of bearings 47 and 49 are secured to the upper surface of plate 31 and have a shaft 51 rotatably mounted therein and extending therethrough. Shaft 51 has a double pulley means 53 mounted on its outer end and a universal joint 55 mounted on its inner. V-belts 57 and 59 extend around and between double pulley means 45 and 53 and are held in driving engagement therewith by roller element 37.

As best seen in FIG. 2, a pair of bearings 61 and 63 are secured to the upper surface of plate 31 and have a shaft 65 rotatably mounted therein and extending therethrough. Shaft 65 has a universal joint 67 mounted on its rearward end which is secured to universal joint 55 and has a windrow turning wheel 69 secured to its forward end.

Windrow turning wheel 69 includes a central hub portion 71 which is rigidly secured to the forward end of shaft 65 and which has a plurality of spokes 73 extending radially outwardly therefrom. A rim 75 is secured to the outer ends of spokes 73 by any convenient means such as by welding or the like. A plurality of spaced apart tines or teeth 77 are secured to rim 77 and extend outwardly therefrom as seen in the drawings. Each of the teeth 77 includes a base portion 79 which is secured to rim 75 by welding or the like and a finger portion 81 extending therefrom. Finger portion 81 includes a straight portion 83 and an inclined portion 85. As best seen in FIG. 4, inclined portion 85 extends forwardly with respect to straight portion 83 when the teeth are at the bottom of the wheel or in other words when the teeth are in a windrow engaging position. A circular disk member 87 is secured to rim 75 by welding or the like at the forward side of windrow turning wheel 69 to prevent material from becoming entangled in spoke 73.

As best seen in FIGS. 1 and 2, a support arm 89 is secured to the rearward end of frame member 21 by bolts or the like and the free end of frame member 17 by a C-clamp or the like and extends therebetween. A support arm 91 is secured to support arm 89 intermediate the length thereof by any convenient means and extends forwardly and inwardly therefrom to frame member 17 and is secured thereto by a C-clamp or the like.

A shield 93 is secured to the undersides of support arms 89 and 91 by welding or the like and includes a longitudinal portion 95 which is secured to support arm 89 and a diagonal portion 97 extending forwardly and inwardly from the forward end thereof which is secured to support arm 91.

A pair of spaced apart arms 99 and 101 are secured to the lower forward end of frame member 17 by welding or the like and extend downwardly and forwardly therefrom and are adapted to be detachably pivotally connected to arms 103 and 105 respectively which are pivotally secured at their forward ends to tractor 13. Arms 103 and 105 are pivotally connected intermediate their length to three point hitch 11. As best seen in FIG. 4, a brace member 107 is secured to and extends between arms 99 and 101.

A pair of spaced apart ear members 109 and 111 are secured to frame member 17 by welding or the like and extend upwardly therefrom and are also secured to opposite sides of frame member 23. (FIG. 2). The rearward end of arm 113 of three point hitch 11 is detachably pivotally secured between ear members 109 and 111 by means of pin 115.

The windrow turning device 10 is secured to the three point hitch 11 of tractor 13 as previously described. The hydraulically operated three point hitch 11 can selectively raise or lower the windrow turning device as desired. For example, the windrow turning device can be lowered to the ground engaging position seen in FIGS. 1 nad 4 or can be raised to the traveling or transporting positions seen in FIG. 5. When it is desired to turn the windrow, the windrow turning device 10 is lowered until wheel 43 engages the ground. The tractor is maneuvered so that the windrow will be caused to pass between the wheels of the tractor and brought into contact with the windrow turning wheel 69.

As the tractor 13 pulls the windrow turning device 11, wheel 43 will be rotated due to its engagement with the ground surface. The rotation of wheel 43 causes windrow turning wheel 69 to be rotated in a clockwise direction as viewed in FIG. 4. The teeth 77 on the rotating windrow turning wheel 69 engage the windrow and causes the windrow to be turned and thrown towards shield 93. The thrown windrow strikes the inner curved surface of shield 93 which prevents the windrow from being turned completely over in a 360 degree revolution. The turned windrow then passes from the rearward end of shield 93 as the windrow turning device 11 is pulled through the field. The windrow turning device 10 would turn the windrow even if shield 93 was not provided thereon but the material in the windrow would have a tendency to feather out at high speed from centrifugal force. The shield 93 also insures more uniform turning of the windrows under variable wind conditions.

The provision of shield 93 permits the windrow turning device 10 to be pulled through the field at a high rate of speed without fear of turning the windrow in a 360 degree revolution. The single rotating windrow turning wheel 69 and the structure associated therewith prevents the device from shelling the grain in the windrow.

It can be appreciated that the mounting of the windrow turning device 10 on the tractor 13 by means of a three point hitch 11 gives a great deal of maneuverability to the device. The three point connection of windrow turning device 10 with tractor 13 eliminates the "fish tailing" of the windrow turning device 10 with respect to the tractor. The unique means for powering the windrow turning wheel 69 provide the proper speed of rotation for turning wheel 69 at all times, with relation to the forward motion of the machine. The frame means described herein is extremely strong and as a result is extremely durable in use.

Thus it can be seen from the foregoing that the device accomplishes at least all of its stated objectives.

I claim:
1. In a windrow turning device,
a frame means,
a single windrow turning wheel rotatably mounted on said frame means,
a single ground engaging drive wheel rotatably mounted on said frame means,
drive means interconnecting said ground engaging drive wheel and said windrow turning wheel whereby said windrow turning wheel will be rotated upon the rotation of said ground engaging drive wheel,
said frame means including a first frame member extending transversely to the direction of travel of the windrow turning device and having opposite ends; a second frame member extending horizontally diagonally rearwardly from said first frame member, a third frame member secured to said frame member between the ends thereof and extending upwardly and rearwardly therefrom; a fourth frame member secured to said third frame member and extending downwardly and rearwardly therefrom, the lower end of said fourth frame member terminating at a point below said second frame member; said ground engaging wheel being operatively rotatably secured to said fourth frame member, said second and fourth frame members being operatively secured to each other; said windrow turning wheel being operatively rotatably secured to said second frame member and being positioned between said third and fourth frame members, said frame means being adapted to be detachably secured to a tractor multiple point hitch means.

2. The device of claim 1 wherein first and second spaced apart arm members are secured to said first frame member and extend therefrom and are adapted to be operatively detachably secured to first and second hitch members of a tractor three point hitch means, and wherein a support means is operatively secured to said third frame member, said support means being adapted to be detachably pivotally secured to a third hitch member of a tractor three point hitch means.

3. In a windrow turning device,
a frame means,
a single windrow turning wheel rotatably mounted on said frame means,
a single ground engaging drive wheel rotatably mounted on said frame means,
drive means interconnecting said ground engaging drive wheel and said windrow turning wheel whereby said windrow turning wheel will be rotated upon the rotation of said ground engaging drive wheel,
said frame means including a first frame portion extending at least partially around said windrow turning wheel and a second frame portion extending over said turning wheel, each of said first and second frame portions having rearward and forward ends, said first and second frame portions being secured together at their forward ends and also being secured together at their rearward ends, the rearward end of said second frame portion terminating below the rearward end of said first frame portion, said drive wheel being secured to the rearward end of said second frame means said first frame portion being adapted to be detachably connected to two points of a tractor three point hitch means, said second frame portion being adapted to be detachably secured to the third point of the three point hitch means.

4. In a windrow turning device, a frame means having forward and rearward ends, a single windrow turning wheel rotatably mounted on said frame means between the ends thereof, said windrow turning wheel being rotatable about a substantially horizontal axis which is angularly disposed with respect to the normal direction of travel of the frame means so that said turning wheel has a forward end disposed forwardly and laterally of its rearward end, a single ground engaging drive wheel rotatably mounted on said frame means, drive means interconnecting said ground engaging drive wheel and said windrow turning wheel whereby said windrow turning wheel will be rotated upon the rotation of said ground engaging drive wheel, and a shield means mounted on said frame means laterally outwardly of the rearward end of said windrow turning wheel, said drive means causing said windrow turning wheel to be rotated in a direction whereby said windrow turning wheel will engage the windrow and cause the windrow to be turned and thrown towards said shield means, said shield means having an inner surface with respect to said windrow turning wheel which is adapted to receive the windrow thrown thereagainst to prevent the windrow from being turned over in a complete 360 degree revolution.

5. The device of claim 4 wherein said shield means has rearward and forward ends and includes a longitudinal portion extending forwardly from the rearward end of said shield means, said shield means also including a diagonal portion extending forwardly and inwardly from the forward end of said longitudinal portion, said longitudinal and diagonal portions having concave inner surfaces adapted to receive the windrow thrown thereagainst, said concave inner surfaces preventing said windrow from being turned over in said complete 360 degree revolution.

References Cited
UNITED STATES PATENTS

| | | | |
|---|---|---|---|
| 2,519,005 | 8/1950 | Thompson et al. | 56—372 |
| 2,652,679 | 9/1953 | Krause | 56—372 |
| 2,741,892 | 4/1956 | Collette | 56—372 |
| 2,985,993 | 5/1961 | Tuft | 56—377 |

FOREIGN PATENTS

| | | |
|---|---|---|
| 529,435 | 7/1931 | Germany. |
| 859,340 | 1/1961 | Great Britain. |
| 792,782 | 4/1958 | Great Britain. |

LUCIE H. LAUDENSLAGER, Primary Examiner

U.S. Cl. X.R.

56—372